Dec. 28, 1937.  H. E. KENNEDY ET AL  2,103,727
ELECTRIC WELDING
Filed Nov. 9, 1934
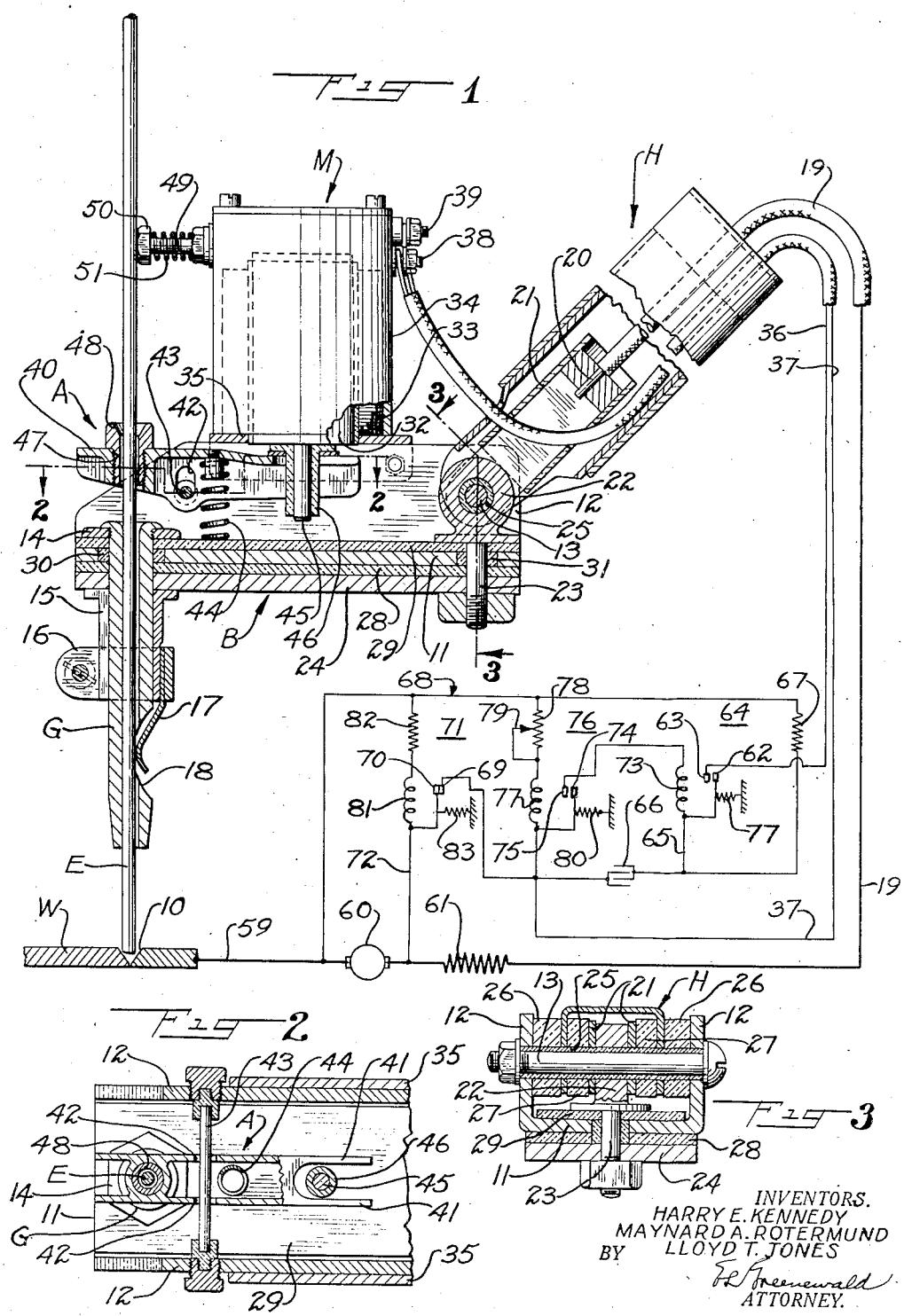
INVENTORS.
HARRY E. KENNEDY
MAYNARD A. ROTERMUND
LLOYD T. JONES
BY
ATTORNEY.

Patented Dec. 28, 1937

2,103,727

UNITED STATES PATENT OFFICE

2,103,727

ELECTRIC WELDING

Harry E. Kennedy, Maynard A. Rotermund, and Lloyd T. Jones, Berkeley, Calif., assignors, by mesne assignments, to Union Carbide and Carbon Corporation, a corporation of New York Application November 9, 1934, Serial No. 752,244

28 Claims. (Cl. 219—8)

This invention relates to electric welding, and more particularly to an improved welding system and apparatus for controlling the feeding of a welding electrode toward the work.

In automatic welding apparatus it has generally been the practice to provide means for substantially continuously feeding the electrode to the work, and controlling the rate of feeding in accordance with an electrical characteristic of the arc established between the electrode and the work. Such feeding means usually has not been embodied in manually operable welding apparatus because, in manual welding, it has been the customary practice to employ tongs for holding the electrode in welding relation to the work and manually feeding the same thereto.

In electric welding it is particularly desirable to maintain the position of the fusing end of the electrode substantially constant with respect to the work to insure the producing of strong welds of uniform quality. It can therefore be seen that, in manual welding, maintaining the proper position of the electrode with respect to the work is one of the most important problems confronting a welder.

The objects of this invention are to provide an improved welding system and apparatus for maintaining the position of the fusing end of an electrode substantially constant with respect to the work; to provide such apparatus which can be employed in a fully automatic welding system or in a semi-automatic welding system in which a weld is produced manually by an operator; to provide a portable hand tool which can be effectively employed to produce welds semi-automatically; to provide an improved control system responsive to an electrical characteristic of an arc or welding circuit for controlling an electrical translating device adapted to feed an electrode to the work; and to provide such a control system in which the electrode is fed rapidly toward the work in small increments.

These and other objects of this invention will become apparent from the following description and accompanying drawing, in which:

Fig. 1 diagrammatically illustrates one embodiment of a control system that we have provided, and a sectional view of a portable hand welding tool having a support and guide for a welding electrode adapted to be fed to the work by electrically operable mechanism incorporated in the tool and influenced by the control system;

Fig. 2 is a sectional view taken at line 2—2 of Fig. 1; and

Fig. 3 is a sectional view taken at line 3—3 of Fig. 1.

In the present invention a welding electrode is preferably fed rapidly to the work in small increments by an electrical translating device having a control circuit associated therewith which is influenced by an electrical condition, such as the voltage, of the welding circuit. In the drawing we have illustrated the feeding mechanism incorporated in a light and compact portable hand welding tool which can be readily moved manually relatively to the work. Although the electrode is fed automatically to the work in such a portable hand welding tool, we preferably term welding with a hand tool of this type "semi-automatic welding" because the welder manually holds the tool with the electrode in welding relation to the seam in the work and moves the tool relatively to the work. It is to be understood, however, that the principles of this invention can readily be employed in fully automatic or other forms of semi-automatic welding apparatus.

Referring to Fig. 1, we have illustrated a portable hand welding tool for feeding a welding electrode E toward the work W. The work W, electrode E, and portions of the tool form part of a welding circuit and, as the electrode is fed to the work, it is fused and deposited in the seam 10.

The tool shown comprises a body B including a channel member 11 having flanges 12. A hollow handle H adapted to be grasped by an operator or welder is pivotally secured by a pin 13 to one end of the channel member 11. A tube G for guiding the electrode E extends through an opening at the forward end of the web of the channel member 11 and is secured thereto by a washer 14 and sleeve 15. The sleeve 15 is fixed to the tube G by a clamp 16 which also maintains in position a spring clip 17 that is biased frictionally to contact and support the electrode E at the opening 18 in the tube G.

Welding current is supplied to the electrode E through a conductor 19 which extends into the handle H and is secured at its end at 20 to a metallic sleeve 21. This sleeve is also pivotally secured by the pin 13 to the end of the channel member 11, the side walls of which sleeve bear against the head 22 of a stud 23, as shown in Fig. 3. The stud 23 extends through an opening in the web of the member 11 and effectively conducts current from the sleeve 21 to a plate 24 which is disposed against the underside of the member 11 and extends along the entire length thereof. The current is then conducted from the plate 24 through the sleeve 15 and spring clip 17 to the electrode E.

To insulate the channel member 11 and handle H from the current carrying parts of the tool the pin 13 is provided with an insulating quill 25. On this quill and between the flanges 12 and handle H and the sleeve 21 are mounted insulating disks 26 and 27 respectively, as clearly shown in Fig. 3. The guide tube G, plate 24, and stud 23 are also insulated from the channel member 11 by providing an insulating plate 28 between its web and plate 24, and another insulating plate 29 adjacent the inside surface of the web. Insulating ferrules 30 and 31 are also provided at the openings in the member 11 through which the tube G and stud 23 extend.

In accordance with this invention the electrode E is fed rapidly toward the work in small increments of advance by an electrical translating device which is adapted to be intermittently energized and deenergized. We preferably employ an electromagnet M comprising a core 32 having a coil 33 wound thereon which is enclosed in a housing 34. The housing 34 is attached to a base 35 which is secured to the edges of the flanges 12 of the channel member 11. Electrical energy for operating the electromagnet M may be provided by conductors 36 and 37 which extend through the handle H and are connected to the terminals 38 and 39 of the coil 31.

Arranged adjacent the lower end of the core 32 and disposed between the flanges 12 of the channel member 11 is an armature A comprising an inverted U-shaped member 40 having bifurcated arms 41 at one end thereof, as shown clearly in Fig. 2. The side walls of the member 40 are provided with elongated openings 42 through which extends a pin 43 fixedly secured to the flanges 12 of the channel member 11. When the coil 33 is energized the member 40 is moved away from the core 32 against the tension of a spring 44 which is disposed between the member 40 and insulating plate 29. Upon deenergization of the coil 33, the spring 44 effectively acts to urge the member 40 toward the core 32. As the member 40 moves toward and from the core 33 it is guided by a pin 45 extending downward from the core between the bifurcated arms 41, which pin is fitted with an insulating sleeve 46.

The forward end of the member 40 is provided with a threaded aperture 47 adapted to receive a bushing 48 having an opening or aperture slightly greater than the diameter of the electrode E which extends therethrough. When the armature A is adjacent the end of the core 32, as shown in Fig. 1, the opening in the bushing 48 is in direct alignment with the bore of the tube G and the frictional contact of the spring clip 17 on the electrode E prevents any movement of the latter. Upon energization of the coil 33 the armature A is moved away from the end of the core 32 against the tension of the spring 44. During the initial downward movement of the armature A, the member 40 tends to pivot about the pin 43 so that the bushing 48 cramps the electrode E. After this initial pivotal movement, the member 40 moves downward and, due to the cramping of the electrode E by the bushing 48, the electrode E also advances toward the work against the frictional contact of the spring clip 17. The movement or length of stroke of the member 40 at the bushing end thereof is limited by the length of the elongated openings 42. At the end of the stroke the pin 43 is contacting the upper edges of the openings 42 and the electrode E has moved a short increment of advance toward the work. Upon deenergization of the coil 33, the spring 44 effectively returns the member 40 to its initial position. During such return movement, the bushing 48 releases its hold on the electrode E and the spring clip 17 supports the electrode in position in the tube G.

To insure an effective and positive feeding of the electrode with each alternate stroke or movement of the armature A, a threaded stud 49 is secured to the housing 40, the head 50 of which stud bears against a side of the electrode as it is fed toward the work. The position of the head 50 may be adjusted for different sizes of electrodes, and the stud is provided with a helical spring 51 which biases the head 50 against the electrode. The bushing 48 may also be interchangeable with other similar bushings to accommodate larger or smaller electrodes than that shown.

In operating the portable tool just described, the conductor 19 of the tool and the work W are connected to a suitable source of electrical energy. As shown, the work W is connected through a conductor 59 to one terminal of a direct current generator 60, the opposite terminal of which is connected through a ballast resistor 61 to the conductor 19 of the tool.

A control circuit, which includes the electromagnet coil 33, is intermittently energized and deenergized to feed the electrode E toward the work. In the present embodiment the control circuit comprises the electromagnet coil 33, conductor 36, normally open cooperating contacts 62 and 63 of a relay 64, conductor 65, condenser 66, and conductor 37. The condenser 66 is connected to a suitable source of electrical energy, such as the welding generator 60. As shown, one terminal of the condenser is connected through a resistor 67 and conductor 68 to one terminal of the generator 60, and the opposite terminal thereof is connected through the cooperating contacts 69 and 70 of relay 71 and conductor 72 to the other terminal of the generator 60. The condenser 66 is also connected across the operating coil 73 of the relay 64 through the conductor 65 and cooperating contacts 74 and 75 of relay 76.

Assuming contacts 74 and 75 of relay 76 to be closed and the condenser 66 connected across the terminals of the generator 60, the operation of the control circuit is substantially as follows: When the condenser 66 is substantially charged, the voltage across its terminals is of such a value that the operating coil 73 of relay 64 will be sufficiently energized to close the contacts 62 and 63 and complete the control circuit. The energy stored in the condenser will then be discharged through the control circuit and momentarily energize coil 33 to effect a downward movement of the armature A and advance the electrode a short increment toward the work. When the condenser 66 is substantially discharged, the voltage across its terminals decreases to such a low value that the operating coil 73 of relay 64 is ineffective to maintain contacts 62 and 63 closed against the tension of the spring 77. The contacts 62 and 63 will then separate to open the control circuit and fully deenergize the coil 33, and the armature A will be moved upward by the helical spring 44. After the contacts 62 and 63 are opened, the condenser 66 will again be charged and the operation just described will be repeated to intermittently energize and deenergize the coil 33 of the electromagnet M.

As long as the arc length is at or greater than a predetermined value, the condenser 66 will be alternately charged and discharged to effect a feeding of the electrode toward the work. When the arc length becomes less than the predetermined value, the operating coil 73 of the relay 64 is rendered inoperative to close the contacts 62 and 63 of the control circuit, whereby the coil 33 of the electromagnet M will remain deenergized. We accomplish this by providing the relay 76 having an operating coil 77 which is connected to be responsive to the voltage of the welding circuit. As shown, one terminal of the coil 77 is connected through a resistor 78, having an adjustable contact 79, to the conductor 68; and the opposite terminal thereof is connected through the cooperating contacts 69 and 70 of relay 71 to the conductor 72.

The contact 79 of the resistor 78 is preferably adjusted so that the coil 77 is effective to close the contacts 74 and 75 when the welding circuit voltage is at or above a definite value, and ineffective to close the contacts against the tension of the spring 80 when the welding circuit voltage is less than the definite value. Since the voltage of the welding circuit increases as the arc length increases and decreases as the arc length decreases, it will be quite evident that this definite value of welding circuit voltage will correspond to a particular value of arc length. Hence, when the arc length is at or greater than the particular or predetermined value, the coil 77 is effective to close the contacts 74 and 75 and the coil 73 of the relay 64 will be rendered operative to complete the control circuit when the condenser 66 is charged. Conversely, when the arc length is less than the predetermined value the coil 77 is ineffective to close the contacts 74 and 75, and the coil 73 of the relay 64 will be rendered inoperative to complete the control circuit.

In order to protect the parts of the control system when the voltage of the generator 60 is excessive, as at no load, for example, we provide the protective relay 71 having cooperating contacts 69 and 70 and an operating coil 81. One terminal of the coil 81 is connected to the conductor 72 and the opposite terminal thereof is connected through a current limiting resistor 82 to the conductor 68. The relay 71 is preferably adjusted so that the coil 81 will be effective to open the contacts 69 and 70, against the tension of the spring 83, when the welding circuit voltage becomes greater than the maximum value that is ordinarily encountered in practice. When the contacts 69 and 70 open, due to an excessive voltage, the condenser 66 and operating coil 77 of relay 76 are disconnected from the welding circuit. When the welding circuit voltage is below the predetermined maximum value, the contacts 69 and 70 will close and render the relay 76 operative and connect the condenser 66 to a source of electrical energy.

It will thus be seen that an improved welding system and apparatus have been provided which will feed the electrode rapidly toward the work in small increments and maintain the position of the fusing end of the electrode substantially constant with respect to the work. When the apparatus is embodied in a portable hand welding tool, as described above, any movement of the tool toward or from the work during welding will immediately decrease or increase the rate of normal electrode feed to maintain the arc length substantially constant.

While we have shown a particular embodiment of our invention, it will be obvious to those skilled in the art that modifications may be made and that certain features may be used independently of others without departing from the spirit and scope of our invention.

We claim:

1. In welding apparatus, the combination of a welding circuit including the work and a movable electrode, means for feeding the electrode to the work comprising an electrical translating device having a control circuit associated therewith, means for intermittently energizing and fully deenergizing said control circuit when the fusing end of the electrode is at or more than a predetermined distance from the work, and means responsive to an electrical condition of said welding circuit for rendering said last-mentioned means inoperative when the fusing end of the electrode is less than the predetermined distance from the work.

2. In welding apparatus, the combination of a welding circuit including the work and a movable electrode, means for feeding the electrode to the work comprising an electrical translating device having a control circuit associated therewith, means for intermittently energizing and deenergizing said control circuit when the voltage of said welding circuit is at or greater than a predetermined normal value, means connected to said welding circuit and responsive to a value of voltage thereof less than the predetermined normal value for rendering said control circuit energizing and deenergizing means inoperative, and means responsive to an excessive value of voltage of said welding circuit for disconnecting said last-mentioned means from said welding circuit.

3. In welding apparatus, the combination of a welding circuit including the work and a movable electrode, means for feeding the electrode to the work comprising an electrical translating device having a normally open control circuit associated therewith, means for intermittently completing and opening said control circuit when the fusing end of the electrode is at or more than a predetermined distance from the work so as to effect a feeding of the electrode in small increments of advance, and means responsive to an electrical condition of said welding circuit for rendering said last-mentioned means inoperative when the fusing end of the electrode is less than the predetermined distance from the work.

4. In welding apparatus, the combination of a welding circuit including the work and a movable electrode, means for feeding the electrode to the work comprising an electrical translating device having a circuit including a pair of normally open cooperating contacts, means for intermittently closing said contacts when the fusing end of the electrode is at or more than a predetermined distance from the work, and means responsive to an electrical condition of said welding circuit for rendering said last-mentioned means inoperative when the fusing end of the electrode is less than the predetermined distance from the work.

5. In welding apparatus, the combination of a welding circuit including the work and a movable electrode, means for feeding the electrode to the work comprising an electrical translating device having a circuit including a pair of normally open cooperating contacts, a source of electrical energy, a condenser connected to said source of electrical energy, means responsive to a charged condition of said condenser for closing said contacts to momentarily complete the circuit of said device, said contact closing means being rendered inoperative when said condenser is substantially discharged, and means independent of the condition of said condenser and responsive to an electrical characteristic of said welding circuit for controlling said contact closing means.

6. In welding apparatus, the combination of a welding circuit including the work and a movable electrode, means for feeding the electrode to the work comprising an electrical translating device having a circuit associated therewith including a condenser and a pair of normally open cooperating contacts, means for connecting said condenser to a source of electrical energy, means responsive to a charged condition of said condenser for closing said contacts to complete said control circuit and momentarily energize said translating device, said contact closing means being rendered inoperative when said condenser is substantially discharged, and means independent of the condition of said condenser and responsive to an electrical characteristic of said welding circuit for controlling said contact closing means.

7. In welding apparatus, the combination of a welding circuit including the work and a movable electrode, means for feeding the electrode to the work comprising a relay having an operating coil and a pair of normally open cooperating contacts, an electrical translating device having a control circuit including said contacts and a condenser connected in series relation therewith, means for connecting said condenser to said welding circuit, means for connecting said coil to be responsive to a charged condition of said condenser for closing said contacts to energize said translating device, said coil being ineffective to close said contacts when the condenser is substantially discharged, and means independent of the condition of said condenser and responsive to an electrical characteristic of said welding circuit for rendering said coil connecting means inoperative.

8. In welding apparatus, the combination of a welding circuit including the work and a movable electrode, means for feeding the electrode to the work comprising a relay having an operating coil and a pair of normally open cooperating contacts, an electrical translating device having a control circuit including said contacts and a condenser connected in series relation therewith, means for connecting said condenser to said welding circuit, a second relay having an operating coil and a pair of cooperating contacts connected in series relation with the coil of said first-mentioned relay, means for connecting the coil of said first-mentioned relay to be responsive to a charged condition of said condenser for closing the contacts of said first-mentioned relay so as to energize said translating device, the coil of said first-mentioned relay being ineffective to close the contacts of said first-mentioned relay when said condenser is substantially discharged, and means for connecting the coil of said second-mentioned relay to be responsive to an electrical characteristic of said welding circuit for opening the contacts of said second-mentioned relay when the fusing end of said electrode is less than a predetermined distance from the work.

9. In welding apparatus, the combination of a welding circuit including the work and a movable electrode, mechanism for feeding an electrode to the work comprising reciprocable means operative to advance the electrode on alternate strokes, means for moving said reciprocable means in opposite directions including an electrical device associated therewith, means for intermittently energizing and fully deenergizing said electrical device to move said reciprocable means in one of said directions and subsequently to permit movement thereof in the opposite direction when the fusing end of said electrode is at or more than a predetermined distance from the work, and means responsive to an electrical condition of the welding circuit for rendering said last-mentioned means inoperative when the fusing end of the electrode is less than the predetermined distance from the work.

10. In welding apparatus, the combination of a welding circuit including the work and a movable electrode, means for feeding the electrode to the work comprising an electromagnet having a reciprocable armature operative to advance the electrode on alternate strokes, means for moving said armature in opposite directions, said moving means including means for intermittently energizing and fully deenergizing said electromagnet to move said armature in one of said directions when the fusing end of said electrode is at or more than a predetermined distance from the work, and means responsive to an electrical condition of said welding circuit for rending said last-mentioned means inoperative when the fusing end of the electrode is less than the predetermined distance from the work.

11. Welding apparatus including an apertured member adapted to closely surround an electrode extending therethrough; and means for reciprocating said member; said means angularly displacing the axis of the aperture of said member relative to the axis of said electrode on alternate strokes, whereby the walls of said aperture clampingly engage opposite sides of said electrode at longitudinally spaced points on said alternate strokes to advance said electrode in one direction only.

12. In welding apparatus, the combination of reciprocable apertured means for guiding an electrode closely surrounded thereby; and means for reciprocating said first-named means and angularly displacing the same in the plane of reciprocation on alternate strokes to thereby cause the walls of the aperture therein to directly contact opposite sides of said electrode at longitudinally spaced points on said alternate strokes to clamp said electrode to advance the same in one direction only, the walls of said aperture moving in spaced parallel relation to said electrode on strokes in the opposite direction.

13. In welding apparatus, the combination of an apertured reciprocable member closely surrounding an electrode extending therethrough; means, including an electrically operable device, for reciprocating said member; said means angularly displacing said member on alternate strokes to cause the walls of the aperture therein to directly contact said electrode on opposite sides at longitudinally spaced points to clamp said electrode to advance the same in one direction, the walls of said aperture moving in spaced parallel relation to said electrode on strokes in the opposite direction; and means for maintaining said electrode stationary during said strokes in the opposite direction.

14. A portable hand welding tool including means for guiding an electrode; an apertured reciprocable member closely surrounding an electrode extending therethrough; and means including an electrically operable device for reciprocating said member; said means bodily oscillating said member in the plane of reciprocation on every alternate stroke to thereby cause the walls of the aperture therein to clampingly engage opposite sides of said electrode at spaced points to advance said electrode intermittently in small increments.

15. A portable hand welding tool including a body having a handle; means secured to said body for guiding an electrode; means for feeding the electrode, including an electromagnet mounted on said body and having an armature provided with an aperture through which an electrode extends; said means reciprocating said armature and also bodily oscillating the same in the plane of reciprocation to thereby cause the walls of said aperture to clampingly engage opposite sides of said electrode at longitudinally spaced points on every alternate stroke to advance the same in one direction; and means for intermittently energizing and deenergizing said electromagnet.

16. In welding apparatus, the combination of mechanism for feeding an electrode comprising an electromagnet having a core; a reciprocable armature disposed at one end of said core and having an aperture through which an electrode extends; means for reciprocating said armature and also bodily oscillating the same about an axis perpendicular to the axis of the aperture to thereby cause the walls of the aperture to clampingly engage opposite sides of the electrode at longitudinally spaced points on every alternate stroke to advance said electrode in one direction; and means for moving said armature in the opposite direction; said moving means including means for intermittently energizing and deenergizing said electromagnet to effect a movement of the armature in one of said directions.

17. In welding apparatus, the combination of a welding circuit including the work and a movable electrode, means for feeding the electrode to the work comprising an electrical translating device having a control circuit associated therewith, and means for intermittently storing energy in said control circuit and effecting the discharge of said energy to actuate said translating device.

18. In welding apparatus, the combination of a welding circuit including the work and a movable electrode, means for feeding the electrode to the work comprising an electrical translating device having a control circuit associated therewith, means for intermittently storing energy in said control circuit and effecting the discharge of said energy to actuate said translating device when the fusing end of the electrode is at or more than a predetermined distance from the work, and means responsive to an electrical condition of said welding circuit for rendering said last-mentioned means inoperative when the fusing end of the electrode is less than the predetermined distance from the work.

19. In welding apparatus, the combination of a welding circuit including the work and a movable electrode, means for feeding the electrode † the work comprising an electrical translating device having a control circuit associated therewith, and means for intermittently energizing and fully deenergizing said control circuit for actuating said device to feed the electrode only intermittently in small increments of advance to the work.

20. In welding apparatus, the combination of a welding circuit including the work and a movable electrode, means for feeding the electrode to the work, a circuit associated with said feeding means, means for intermittently energizing and fully deenergizing said circuit associated with said feeding means for actuating the latter, and means responsive to an electrical condition of said welding circuit for controlling said last-mentioned means.

21. In welding apparatus, the combination of a welding circuit including the work and a movable electrode, means for feeding the electrode to the work, a circuit associated with said feeding means, means for intermittently storing energy in said circuit associated with said feeding means and effecting the discharge of said energy to actuate said feeding means, and means responsive to an electrical condition of said welding circuit for controlling said last-mentioned means.

22. In welding apparatus, the combination of a welding circuit including the work and a movable electrode, means for feeding the electrode to the work, a normally open circuit associated with said feeding means, means for intermittently completing and opening said circuit associated with said feeding means to actuate the latter to feed the electrode only intermittently in small increments of advance to the work, and means responsive to an electrical condition of said welding circuit for controlling said last-mentioned means.

23. In welding apparatus, the combination of a movable member having an aperture, a guide member having an opening extending lengthwise thereof aligned with the aperture in said movable member, the aperture and the opening being adapted to receive an electrode for guiding the same toward work to be welded, means for imparting a reciprocatory movement to said movable member, said movable member being capable of cramping the electrode at the aperture on alternate strokes to advance the same through the opening in said guide member, and means cooperating with said guide member for maintaining the electrode stationary during the other ineffective alternate strokes of said movable member.

24. In welding apparatus, the combination of a movable member having an aperture, a guide member having an opening extending lengthwise thereof aligned with the aperture in said movable member, the aperture and the opening being adapted to receive an electrode for guiding the same toward work to be welded, means for imparting a reciprocatory movement to said movable member, said movable member being capable of cramping the electrode at the aperture on alternate strokes to advance the same through the opening in said guide member, said guide member having an additional opening extending through the wall thereof, and resilient means secured to said guide member and extending through the last-mentioned opening adapted to bear against the electrode for maintaining the latter stationary during the other ineffective alternate strokes of said movable member.

25. In welding apparatus, the combination of a movable member having an aperture, a bushing having an opening adapted to be secured to said movable member at the aperture, the opening being adapted to receive an electrode, and means for imparting a reciprocatory movement to said movable member, said movable member being capable of cramping the electrode at the opening of said bushing on alternate strokes to advance the electrode intermittently in small increments toward work to be welded, said bushing being detachable from said movable member and interchangeable with other similar bushings to accommodate electrodes of different sizes.

26. An electrode feeding mechanism comprising an apertured reciprocable member; and means for reciprocating and bodily oscillating said member to thereby cause the walls of the aperture therein to clampingly engage, at longitudinally spaced points, opposite sides of an electrode passed therethrough to positively advance said electrode in one direction only on alternate strokes.

27. A wire feeding apparatus including an apertured member; means to reciprocate said member; means adapted to at times bodily oscillate said member to thereby cause the walls of the aperture therein to clampingly engage, at longitudinally spaced points, opposite sides of a wire passed therethrough to positively feed said wire in one direction only.

28. A feeder for electric welding electrodes comprising an apertured member adapted to have an electrode passed therethrough; and means for reciprocating said apertured member in a direction parallel to the axis of said electrode; said means also bodily oscillating said apertured member about an axis perpendicular to said first axis, said apertured member being immovable with respect to said means.

HARRY E. KENNEDY.
MAYNARD A. ROTERMUND.
LLOYD T. JONES.